(12) United States Patent
Martinez

(10) Patent No.: US 9,852,472 B1
(45) Date of Patent: Dec. 26, 2017

(54) TRADING SOFTWARE

(71) Applicant: Martin Armando Martinez, Coral Gables, FL (US)

(72) Inventor: Martin Armando Martinez, Coral Gables, FL (US)

( * ) Notice: Subject to any disclaimer, the term of this patent is extended or adjusted under 35 U.S.C. 154(b) by 504 days.

(21) Appl. No.: 14/634,086

(22) Filed: Feb. 27, 2015

(51) Int. Cl.
*G06Q 40/04* (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| | | | | |
|---|---|---|---|---|
| 2006/0259382 A1* | 11/2006 | Kemp, II | ............... | G06Q 20/10 705/35 |
| 2014/0279358 A1* | 9/2014 | Rosenberg | ............. | G06Q 40/04 705/37 |
| 2017/0132704 A1* | 5/2017 | Mauro, Jr. | ............. | G06Q 40/04 |

OTHER PUBLICATIONS

Oanda Corporation. Platform 1: http://fxtrade.oanda.com/platforms#1. Oanda Corporation. 185 Berry Street, Suite 4700, San Francisco, CA 94107, USA.
Interactive Brokers https://www.interactivebrokers.com/en/?f=%2Fen%2Fpagemap%2Fpagemap_demo.php Interactive Brokers Group, Inc. Interactive Brokers LLC, 209 South LaSalle St, 10th Floor, Chicago, IL 60604, USA.
FXCM Tradestation. Platforms: http://www.fxcm.com/products/trading-station/desktop/custom-features/ Forex Capital Markets, LLC. 55 Water St., 50th Floor, New York, NY 10041 USA.
Multi Charts http://youtu.be/Zu__AjBpbjNI—Screen Shot of Video MultiCharts, LLC, Westerville, OH, USA.
Metatrader 4 /MT4, original order platform for MT4 http://youtu.be/kErQ_EBz4F0—Screen Shot of Video MetaQuotes Software Corp.
MT4 Trading From Charts 2. This is done by outsiders/not MT4 http://www.fat-forex-profits.com/ Fat Forex Trading is based in Vilniaus 53,Ziezmariai, 56239 Lithuania.
MT4 Trading Plaform Option 3. This is done by Pecunia Systems, LTD, not MT4 http://www.pecuniasystems.com/ Pecunia Systems Ltd is based in Rue Adrien-Lachenal 20, 1207 Geneva, Switzerland.

(Continued)

*Primary Examiner* — Robert R Niquette
*Assistant Examiner* — Joseph W King
(74) *Attorney, Agent, or Firm* — Albert Bordas, P.A.

(57) ABSTRACT

Systems and methods for implementing trading software that includes a computer, selling execute a sell transaction, and buying execute a buy transaction. An executing area on the computer display has a price offer indicator, a sell price indicator, a buy price indicator, and a percentage in point spread, whereby the price offer indicator defines a first price for a unit of a specified stock, bond, currency, and/or commodity to be traded shown at the stocks, bonds, currencies, and/or commodities data. The sell price indicator defines a second price to sell each unit to be traded shown at the stocks, bonds, currencies, and/or commodities data, positioned vertically below the sell price indicator. The buy price indicator defines the price to buy each unit, and the percentage in point spread defines a spread, being a difference between the buy price indicator and the sell price indicator.

14 Claims, 3 Drawing Sheets

(56) References Cited

OTHER PUBLICATIONS

Ninja Trader http://www.ninjatrader.com/tour.php#Manual-Trading Trading From Chart NinjaTrader Brokerage™. NinjaTrader™, LLC is a privately held company based in Denver, CO and Chicago, IL with offices in Bamberg, Germany and Amsterdam, The Netherlands.

Trackntrade http://www.trackntrade.com/forex/ Gecko Software, Incorporated. 271 N Spring Creek Parkway, Suite A, Providence, UT 84332 USA.

* cited by examiner

TRADING SOFTWARE

BACKGROUND OF THE INVENTION

1. Field of the Invention

The present invention relates to trading systems, and more particularly, to systems and methods for implementing trading software.

2. Description of the Related Art

In the trading business, executing a "Buy" transaction when a trader's intention is to "Sell", or vice-versa, can have severe consequences.

Prior art trading software comprising a horizontal "Buy"/"Sell" configuration are visually disconnected from a price direction movement, and often fail to alert a trader when a mistake is made executing a "Buy" transaction when a trader's intention was to "Sell", or vice-versa.

Another prior art trading software includes a platform published on the website www.fxtrade.oanda.com/platforms#1 for Oanda FXTrade Platform. However, it differs from the present invention because Oanda FXTrade Platform teaches a horizontal "Buy"/"Sell" configuration.

Another prior art trading software includes a platform published on the website www.fxcm.com/products/trading-station/desktop/custom-features/ for FXCM Tradestation. However, it differs from the present invention because FXCM Tradestation teaches a horizontal "Buy"/"Sell" configuration.

Another prior art trading software includes a platform published on the website www.interactivebrokers.com/en/?f=%2 Fen%2Fpagemap%2Fpagemap_demo.php for Interactive Brokers. However, it differs from the present invention because Interactive Brokers teaches a horizontal "Buy"/"Sell" configuration.

Yet another prior art trading software includes a platform published on the website www.youtu.be/Zu_AjBpbjNI for MultiCharts. However, it differs from the present invention because MultiCharts teaches a horizontal "Buy"/"Sell" configuration.

Yet another prior art trading software includes a platform published on the website www.yotu.be/kErQ_EBz4F0 for Metatrader 4/MT4 original order platform for MT4. However, it differs from the present invention because Metatrader 4/MT4 original order platform for MT4 teaches a horizontal "Buy"/"Sell" configuration.

Yet another prior art trading software includes a platform published on the website www.fat-forex-profits.com/ for MT4 TRADING2. However, it differs from the present invention because MT4 TRADING2 teaches a horizontal "Buy"/"Sell" configuration.

Yet another prior art trading software includes a platform published on the website www.pecuniasystems.com/ for MT4 Trading Platform Option 3. However, it differs from the present invention because Trading Platform Option 3 teaches a horizontal "Buy"/"Sell" configuration.

Yet another prior art trading software includes a platform published on the web site www.ninjatrader.com/tour.php#Manual-Trading for Ninja Trader. However, it differs from the present invention because Ninja Trader teaches a horizontal "Buy"/"Sell" configuration.

Yet another prior art trading software includes a platform published on the website www.trackntrade.com/forex/ for TRACK'NTRADE. However, it differs from the present invention because TRACK'NTRADE teaches a horizontal "Buy"/"Sell" configuration.

Other prior art software provides for a number of more or less complicated features that fail to solve the problem in an efficient and economical way. None of that software suggests the novel features of the present invention.

SUMMARY OF THE INVENTION

The present invention is software for trading. It sets new standards for the trading industry by offering a simplistic vertical execution platform that minimizes one-click execution errors by placing "Buy" and "Sell" buttons vertically. The present invention comprises an array of proprietary features that add redundancy and confirms that a correct trading transaction will be executed. The present invention diminishes the number of errors when executing a trading transaction. The present invention also reduces the learning curve for new traders, whereby it mimics the direction in which price actions flow, vertically up and down. Utilization of the present invention enhances a trader's performance and experience in live trading conditions under duress by simplifying the decision-making process and enabling traders to execute correct trading transactions.

It is therefore one of the main objects of the present invention to provide systems and methods for implementing trading software that minimizes execution errors while executing a "Buy" transaction when a trader's intention is to "Sell", or vice-versa.

It is another object of this invention to provide systems and methods for implementing trading software that offers a simplistic vertical execution platform that minimizes one-click execution errors.

It is another object of this invention to provide systems and methods for implementing trading software that places "Buy" and "Sell" buttons vertically, mimicking the direction in which price actions flow.

It is another object of this invention to provide systems and methods for implementing trading software that includes an array of proprietary features that add redundancy and confirms that a correct trading transaction will be executed.

It is another object of this invention to provide such systems and methods for implementing trading software that is reliable.

It is yet another object of this invention to provide such systems and methods for implementing trading software that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
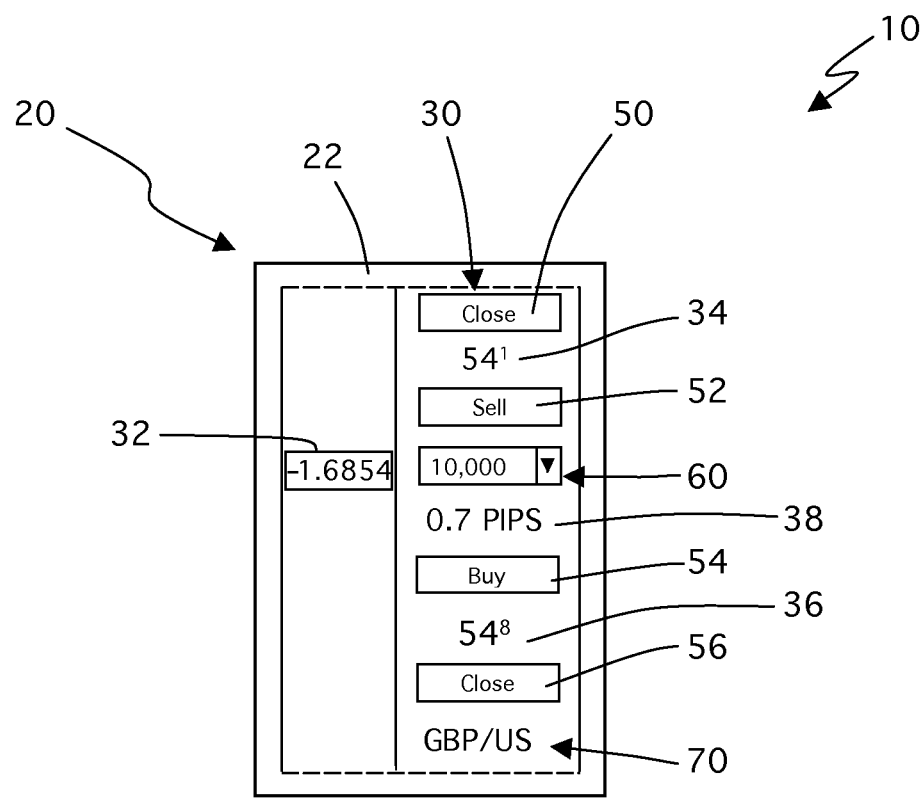
FIG. 1 is a first block diagram of the systems and methods for implementing trading software, object of the present invention.

Referring now to the drawings, the present invention is generally referred to with numeral 10.

Trading is generally defined as the act or process of buying, selling, or exchanging stocks, bonds, currencies, and/or commodities. Most stocks are traded on exchanges, which are places where buyers and sellers meet and decide on a price. Some exchanges are physical locations where transactions are carried out on a trading floor. However, the present invention concerns virtual trading, which is composed of a network of computers where trades are made electronically. The purpose of a stock market is to facilitate the exchange of securities between buyers and sellers, reducing the risks of investing. A primary market is where securities are created (by means of an IPO) while, in a secondary market, investors trade previously-issued securities without the involvement of the issuing-companies. The secondary market refers to the stock market.

The Nasdaq is an example of a virtual market. This type of market has no central location or floor brokers whatsoever. Trading is done through a computer and telecommunications network of dealers. It used to be that the largest companies were listed only on the NYSE while all other second tier stocks traded on the other exchanges. The tech boom of the late '90s changed all this; now the Nasdaq is home to several big technology companies such as Microsoft, Cisco, Intel, Dell and Oracle. On the Nasdaq, brokerages act as market makers for various stocks. A market maker provides continuous bid and ask prices within a prescribed percentage spread for shares for which they are designated to make a market. They may match up buyers and sellers directly but usually they will maintain an inventory of shares to meet demands of investors.

Another exchange is the American Stock Exchange (AMEX). In addition, there are many stock exchanges located in just about every country around the world. American markets are undoubtedly the largest, but they still represent only a fraction of total investment around the globe. The two other main financial hubs are London, home of the London Stock Exchange, and Hong Kong, home of the Hong Kong Stock Exchange.

As seen in FIG. 1, as software for trading, present invention 10 functions on computer 20 comprising display 22. Computer 20 refers to an electronic device containing a microprocessor such as personal computers, desktop computers, towers, laptops, tablets, or smart phones that run an operating system to interface between a user/trader and the microprocessor. It comprises certain common internal components including a CPU and RAM to run software applications designed for specific work, in this case present invention 10. The following are components common to computers 20:

Case—computer 20 case includes a keyboard and screen. For desktop personal computers 20, the case is typically some type of box with lights, vents, and places for attaching cables. The size of the case can vary from small tabletop units to tall towers. A case is typically based on the type of motherboard that will fit inside.

Motherboard—a primary circuit board inside personal computers 20 is its motherboard. Several important components are attached directly to the motherboard. These include a complementary metal-oxide semiconductor (CMOS), which stores information. Motherboards come in different sizes and standards, the most common as of this writing being ATX and MicroATX. From there, motherboards vary by the type of removable components they're designed to handle internally and what ports are available for attaching external devices.

Power supply—other than its CMOS, which is powered by a replaceable CMOS battery on the motherboard, every component in personal computer 20 relies on its power supply. The power supply connects to some type of power source, whether that's a battery in the case of mobile computers 20, or a power outlet in the case of desktop personal computer 20. Some of these cables connect directly to the motherboard while others connect to other components like drives and fans.

Central processing unit (CPU)—the CPU, often just called the processor, is the component that contains the microprocessor. That microprocessor is the heart of all personal computer's 20 operations, and the performance of both hardware and software rely on the processor's performance. Two common CPU architectures are 32-bit and 64-bit, and certain software relies on this architecture distinction.

Random-access memory (RAM)—Even the fastest processor needs a buffer to store information while it's being processed. Each personal computer 20 has a maximum amount of RAM it can handle, and slots on the motherboard indicate the type of RAM the PC requires.

Drives—a drive is a device intended to store data when it's not in use. A hard drive or solid state drive stores computer's 20 operating system and software. This category also includes optical drives such as those used for reading and writing CD, DVD and Blu-ray media. A drive connects to the motherboard based on the type of drive controller technology it uses, including the older IDE standard and the newer SATA standard.

Cooling devices—the CPU and other components can handle a certain amount of heat. Fans are the most common device used to cool personal computer 20. In addition, the CPU is covered by a metallic block called a heat sink, which draws heat away from the CPU.

Cables—cables are designed to carry data, power or both.

Ports and peripherals permit interaction with personal computer 20 and enable adding components using expansion slots.

Graphics components—while some motherboards have on-board graphics, others include an expansion slot to slide in a separate video card. In both cases, the video components in personal computer 20 process some of the complex graphics data going to the screen, taking some of the load off the CPU. A motherboard accepts video cards based on a specific interface, such as the older AGP standard or one of the newer PCI standards.

Ports—the word port is often used to describe a place on the outside of personal computers 20 that receives a cable. Many ports are affixed directly to the motherboard. Some of the ports on personal computer 20 include USB ports; network ports, typically Ethernet and FireWire; video ports, typically some combination of VGA, DVI, RCA/component, S-Video and HDMI; audio ports, typically some combination mini analog audio jacks or RCA; and legacy ports, or ports that follow old standards which are rarely used in modern computers 20, such as parallel printer ports and PS2 ports for a keyboard and mouse.

Peripherals—any piece of hardware that isn't mounted inside personal computer's 20 case is called a peripheral. This includes basic input and output devices: monitors, keyboards and mice. It also includes printers, speakers, headphones, microphones, webcams and USB flash drives. Anything plugged into a port on personal computer 20 is one of personal computer's 20 peripherals.

Expansion slots—the motherboard will include a series of expansion slots. The removable components designed to fit into expansion slots are called cards. Expansion slots add extra video cards, network cards, printer ports, TV receivers and many other custom additions. The card must match the expansion slot type, whether it's the legacy ISA/EISA type or the more common PCI, PCI-X or PCI Express types.

Figure 2A:
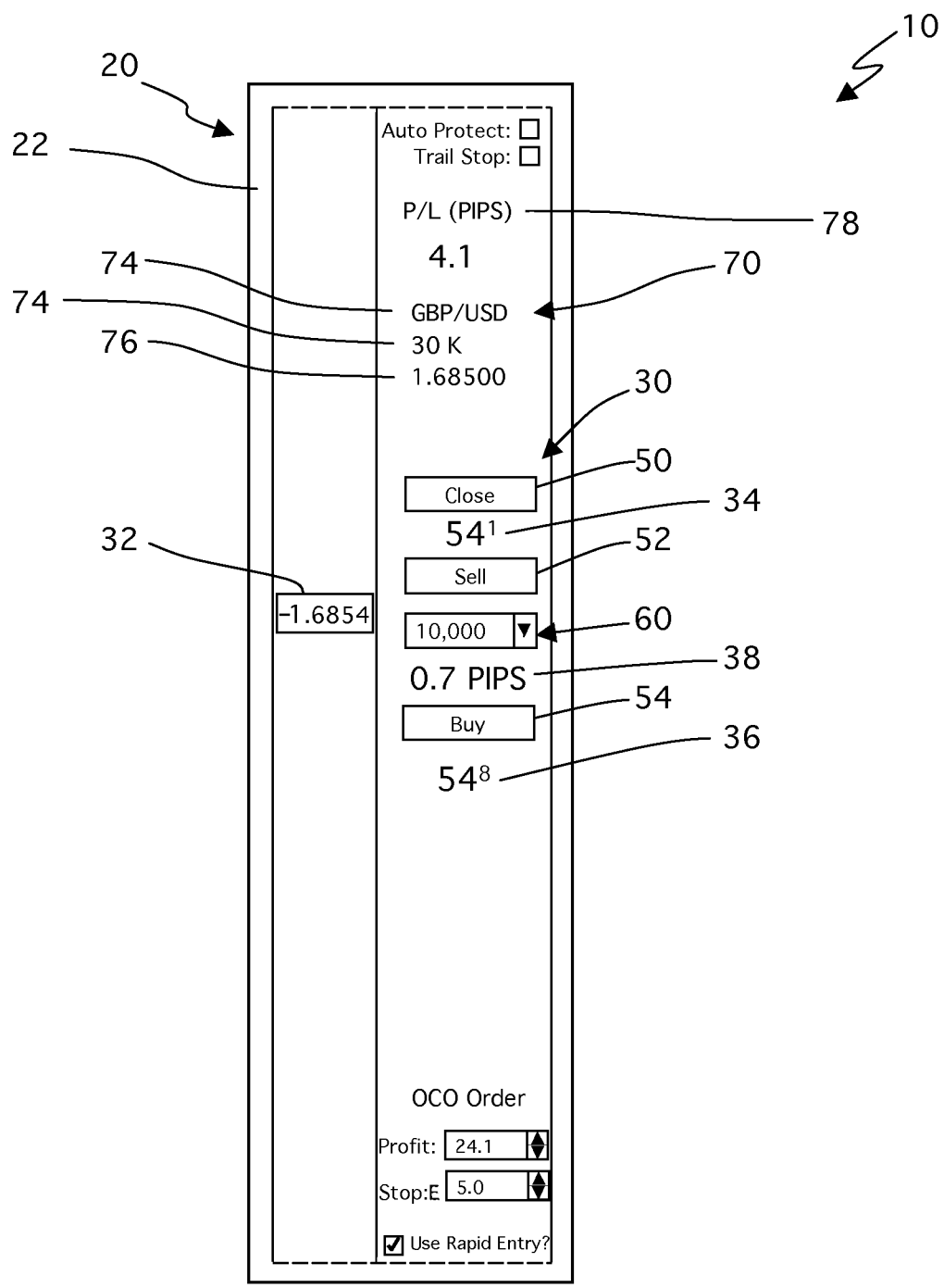
FIG. 2A is a second block diagram of the systems and methods for implementing trading software during a sell execution.
Figure 2B:
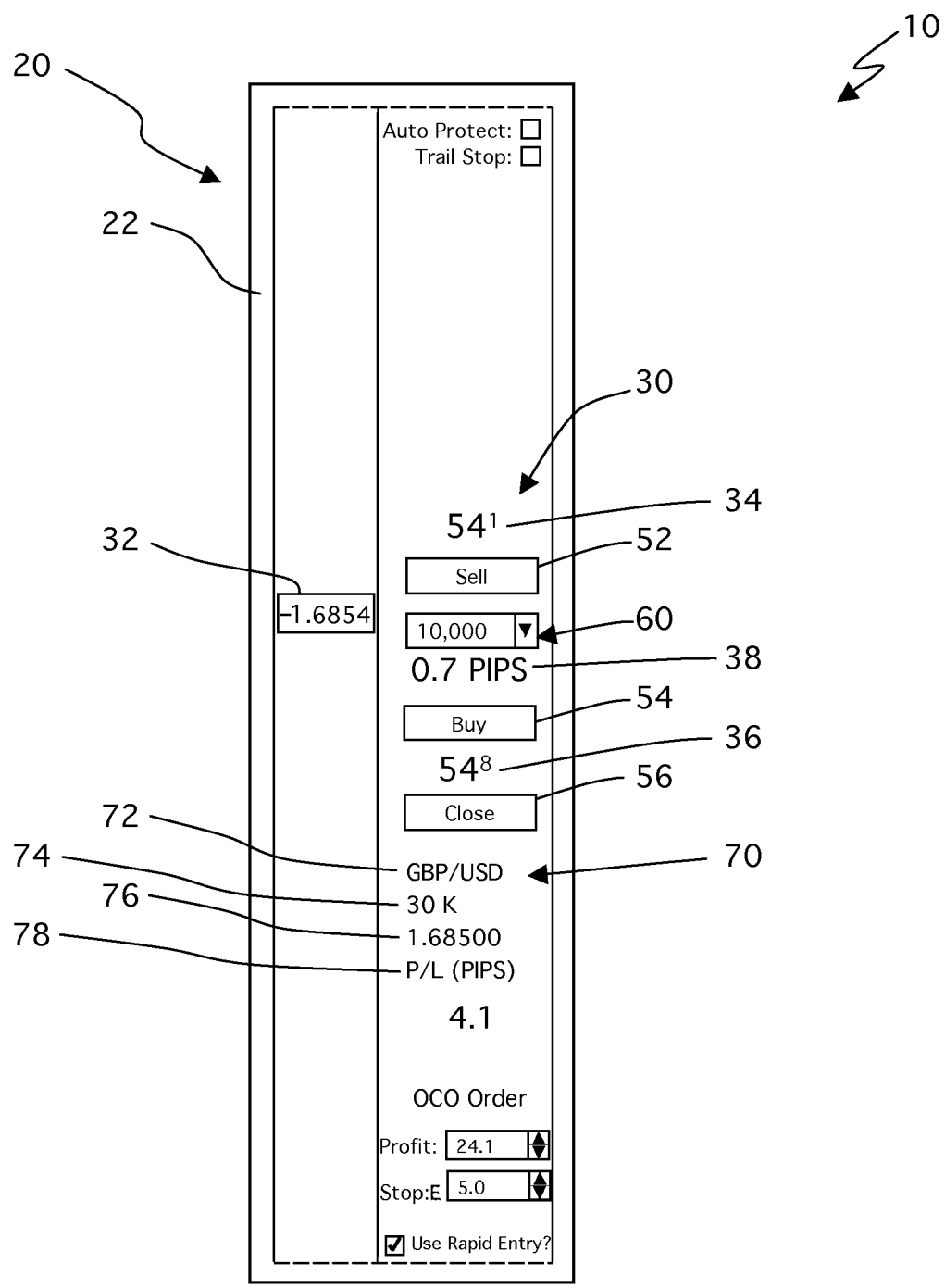
FIG. 2B is a third block diagram of the systems and methods for implementing trading software during a buy execution.

As seen in FIGS. 1, 2A, and 2B as software for trading, present invention 10 functions on computer 20 comprising display 22. Present invention 10 comprises executing area 30 comprising price offer indicator 32, sell price indicator 34, buy price indicator 36, and percentage in point spread 38.

Price offer indicator 32 defines the price for a unit of a specified stock, bond, currency, and/or commodity to be traded shown at stocks, bonds, currencies, and/or commodities data 70.

Sell price indicator 34 defines the price to sell each unit of the specified stock, bond, currency, and/or commodity to be traded shown at stocks, bonds, currencies, and/or commodities data 70.

Positioned vertically below sell price indicator 34, buy price indicator 36 defines the price to buy each unit of the specified stock, bond, currency, and/or commodity to be traded shown at stocks, bonds, currencies, and/or commodities data 70.

Percentage in point spread 38 defines a spread, being the difference between buy price indicator 36 and sell price indicator 34.

Executing area 30 further comprises manual close executable link 50, sell executable link 52, buy executable link 54, and manual close executable link 56.

Manual close executable link 50 closes all positions when activated by a trader.

Sell executable link 52 executes a sell command at the price for a unit of a specified stock, bond, currency, and/or commodity to be traded shown at stocks, bonds, currencies, and/or commodities data 70 as shown at price offer indicator 32.

Positioned vertically below sell executable link 52, buy executable link 54 executes a buy command at the price for a unit of a specified stock, bond, currency, and/or commodity to be traded shown at stocks, bonds, currencies, and/or commodities data 70 as shown at price offer indicator 32.

Manual close executable link 56 also closes all positions when activated by a trader.

Executing area 30 further comprises units for execution 60 that is positioned in between sell executable link 52 and buy executable link 54. Units for execution 60 defines the number of units of a specified stock, bond, currency, and/or commodity to be traded shown at stocks, bonds, currencies, and/or commodities data 70.

The functionality of present invention 10 mimics the direction in which price actions flow, vertically up and down. Utilization of present invention 10 enhances a trader's performance and experience in live trading conditions under duress by simplifying the decision-making process and enabling traders to easily process information and execute correct trading transactions for stocks, bonds, currencies, and/or commodities. The integration of the physical task performed by the trader with the price directional movement, flow in harmony together in one motion.

Therefore, in a preferred embodiment, positioned vertically below sell price indicator 34 is sell executable link 52, positioned vertically below sell executable link 52 is units for execution 60, positioned vertically below units for execution 60 is percentage in point spread 38, positioned vertically below percentage in point spread 38 is buy executable link 54, and positioned vertically below buy executable link 54 is buy price indicator 36.

As best seen in FIGS. 2A and 2B, present invention 10 comprises alert means to alert a trader of a trade being executed in an effort to minimize the likelihood of executing a "Buy" transaction when a trader's intention is to "Sell", or vice-versa.

The alert means comprises the displaying of a position entered on a respective side of each executable link.

Specifically, as seen in FIG. 2A, during a sell execution the alert means comprises stocks bonds, currencies, and/or commodities data 70 positioned vertically above manual close executable link 50. In addition, sell price indicator 34 and sell executable link 52 are red in color.

Also, as seen in FIG. 2B, during a buy execution the alert means comprises stocks bonds, currencies, and/or commodities data 70 positioned vertically below manual close executable link 56. In addition, buy price indicator 36 and buy executable link 54 are green in color.

Furthermore, stocks bonds, currencies, and/or commodities data 70 comprises information and data relevant to the specified stock, bond, currency, and/or commodity to be traded. Such information and data may include identifying a particular stock, bond, currency, and/or commodity to be traded. For purposes of example, stocks, bonds, currencies, and/or commodities data 70 lists GBP/USD 72, defining currency to be traded, and specifically the British Pound with US Dollars. However, it is understood that that any stocks, bonds, currencies, and/or commodities may be listed at stocks, bonds, currencies, and/or commodities data 70. Stocks, bonds, currencies, and/or commodities data 70 may further comprises number of units 74, entry price 76, and profit/loss indicator 78.

Number of units 74 defines the number of units of the specified stock, bond, currency, and/or commodity acquired shown at stocks, bonds, currencies, and/or commodities data 70.

Entry price 76 defines the entry price of the specified stock, bond, currency, and/or commodity acquired shown at stocks, bonds, currencies, and/or commodities data 70.

Profit/loss indicator 78 defines the amount of profit or loss for the specified stock, bond, currency, and/or commodity acquired shown at stocks, bonds, currencies, and/or commodities data 70.

Therefore, present invention 10 presents a visual verification without having the trader to scan to other areas of a platform to verify that a correct position was exercised. If the trader's intentions are different than that of where the position is displayed, the trader can visually recognize it and make changes, whereby sell positions are all displayed vertically above manual close executable link 50, and buy positions entered are all displayed vertically below manual close executable link 56. This eliminates confusion in all market conditions.

The present invention further comprises a method to execute a trade with systems and methods for implementing trading software, comprising the steps:

A) viewing an executing area on a display of a computer, said executing area comprising a price offer indicator, a sell price indicator, a buy price indicator, and a percentage in point spread, whereby said price offer indicator defines a first price for a unit of a specified stock, bond, currency, and/or commodity to be traded shown at said stocks, bonds, currencies, and/or commodities data, said sell price indicator defines a second price to sell each unit of the specified stock, bond, currency, and/or commodity to be traded shown at said stocks, bonds, currencies, and/or commodities data, positioned vertically below said sell price indicator, said buy price indicator defines the price to buy each unit of the specified stock, bond, currency, and/or commodity to be traded shown at said stocks, bonds, currencies, and/or commodities data, and said percentage in point spread defines a spread, being a difference between said buy price indicator and said sell price indicator; and B) executing a buy transaction when a buying transaction is desired; or C) executing a sell transaction when a selling transaction is desired.

Present invention 10 therefore is uniquely positioned to create a paradigm shift.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A method of displaying an executing area on a display of a computer for facilitating a sell transaction of an item being traded in an electronic exchange, the method comprising:

displaying in said executing area of said display a price offer indicator, a sell price indicator, a buy price indicator, a percentage and point spread indicator, and an item indicator which presents information regarding a sell trading position for an item to be traded including an identification of said item, wherein;

said price offer indicator defines an offer price for a unit of said item to be traded, said sell price indicator defines a price to sell each said unit of said item to be traded, said buy price indicator defines a price to buy each said unit of said item to be traded, and said percentage and point spread indicator defines a spread difference between said buy price indicator and said sell price indicator, wherein said buy price indicator is positioned in said executing area vertically below said sell price indicator, and said sell price indicator is positioned vertically below said item indicator;

further displaying in said executing area a sell executable link configured to execute a sell command to sell said item at said price defined by said price offer indicator;

and further displaying in said executing area a buy executable link configured to execute a buy command to buy said item at said price defined by said price offer indicator, wherein positioned vertically below said sell price indicator is said sell executable link, positioned vertically below said sell executable link is an indicator representing a number of units of said item to be traded for a sell execution, positioned vertically below said units for sell execution indicator is said buy executable link, and positioned vertically below said buy executable link is said buy price indicator.

2. The method of claim 1, further characterized in that positioned in said executing area vertically below said units for sell execution indicator is said percentage in point spread indicator.

3. The method of claim 2, further characterized in that positioned in said executing area vertically below said percentage in point spread indicator is said buy executable link.

4. The method of claim 1, further characterized in that said item to be traded and identified by said item indicator is a specified stock, bond, currency, and/or commodity.

5. The method of claim 1, further comprising displaying in said executing area a manual close executable link positioned vertically above said sell price indicator.

6. The method of claim 5, further characterized in that said manual close executable link is configured to close said sell trading position for said item when activated, wherein said sell trading position is displayed by said item indicator.

7. The method of claim 5, further characterized in that said sell executable link is configured to execute a sell command at a price for one or more units of a specified stock, bond, currency, and/or commodity item to be traded as displayed by said price offer indicator.

8. A method of displaying an executing area on a display of a computer for facilitating a buy transaction of an item being traded in an electronic exchange, the method comprising:

displaying in said executing area of said display a price offer indicator, a sell price indicator, a buy price indicator, a percentage and point spread indicator, and an item indicator which presents information regarding a buy trading position for an item to be traded including an identification of said item, wherein;

said price offer indicator defines an offer price for a unit of said item to be traded, said sell price indicator defines a price to sell each said unit of said item to be traded, said buy price indicator defines a price to buy each said unit of said item to be traded, and said percentage and point spread indicator defines a spread difference between said buy price indicator and said sell price indicator, wherein said buy price indicator is positioned in said executing area vertically below said sell price indicator, and said sell price indicator is positioned vertically below said item indicator;

further displaying in said executing area a sell executable link configured to execute a sell command to sell said item at said price defined by said price offer indicator;

and further displaying in said executing area a buy executable link configured to execute a buy command to buy said item at said price defined by said price offer indicator, wherein positioned vertically below said sell price indicator is said sell executable link, positioned vertically below said sell executable link is an indicator representing a number of units of said item to be traded for a buy execution, positioned vertically below said units for buy execution indicator is said buy executable link, and positioned vertically below said buy executable link is said buy price indicator.

9. The method of claim 8, further characterized in that positioned in said executing area vertically below said units for buy execution indicator is said percentage in point spread indicator.

10. The method of claim 9, further characterized in that positioned in said executing area vertically below said percentage in point spread indicator is said buy executable link.

11. The method of claim 8, further characterized in that said item to be traded and identified by said item indicator is a specified stock, bond, currency, and/or commodity.

12. The method of claim 8, further comprising displaying in said executing area a manual close executable link positioned vertically below said buy price indicator.

13. The method of claim 12, further characterized in that said manual close executable link is configured to close said buy trading position for said item when activated, wherein said buy trading position is displayed by said item indicator.

14. The method of claim 12, further characterized in that said buy executable link is configured to execute a buy command at a price for one or more units of a specified stock, bond, currency, and/or commodity item to be traded as displayed by said price offer indicator.

* * * * *